United States Patent Office 3,104,237
Patented Sept. 17, 1963

3,104,237
ACID MONOAZO DYESTUFFS
Franz Frisch, Arlesheim, near Basel, Switzerland, assignor to Sandoz Ltd., Basel, Switzerland
No Drawing. Filed July 13, 1959, Ser. No. 826,445
Claims priority, application Switzerland Aug. 14, 1958
3 Claims. (Cl. 260—196)

The present invention relates to acid monoazo dyestuffs of the formula

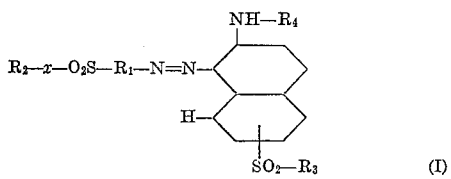

wherein:

$x$ represents the simple linkage or an oxygen atom,
$R_1$ and $R_2$ represent radicals of the benzene series which may be further substituted,
$R_3$ represents hydroxyl, and
$R_4$ represents hydrogen or alkyl which may be substituted, and wherein —N=N— stands in ortho-position to $R_2$—$x$—$O_2S$— and the whole molecule contains one sulfonic acid group.

The process for their production consists in coupling in the 1 position 1 mole of the diazo compound of an amine of the formula

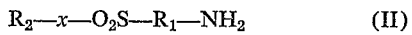

wherein:

$R_1$ and $R_2$ represent radicals of the benzene series which may be substituted, and
$x$ represents an oxygen atom, and wherein —$NH_2$ stands in ortho position to $R_2$—$x$—$O_2S$—, with 1 mole of a coupling component of the formula

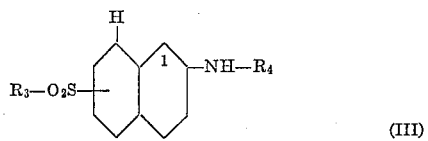

wherein:

$R_3$ represents hydroxyl, and
$R_4$ represents hydrogen or alkyl which may be substituted, the reactants being so chosen that the resulting monoazo dyestuff contains one sulfonic acid group.

Examples of substituents which may be contained in the radicals $R_1$ and $R_2$ are, e.g., halogen atoms (chlorine, bromine), low molecular alkyl or alkoxy groups (methyl, ethyl, isopropyl, methoxy, ethoxy), the sulfonic acid group, sulfonic acid aryl ester groups such as the sulfonic acid phenyl, sulfonic acid-4-methyl-, 4-chloro- or 4-methoxyphenyl esters, the sulfonic acid amide group which may be substituted, e.g. sulfonic acid methyl- to dodecylamide, dimethyl- to dihexylamide, 2-hydroxyethyl-, 2- or 3-hydroxypropyl-, 2-ethoxyethyl-, 3-methoxypropyl-, 3- or 4-methoxybutylamide, di-(2-hydroxyethyl)-, di-(2- or 3-hydroxypropyl)-amide, phenyl-, 2-, 3- or 4-methylphenyl-, chlorophenyl-, methoxyphenyl- or -ethoxyphenylamide, N-methyl-N-phenyl-, N-ethyl-N-phenyl-, N-2-hydroxyethyl-N-phenyl-, N-methoxypropyl-N-phenylamide and sulfonic acid cyclohexyl- and dicyclohexylamide.

The butyl, amyl, octyl and cyclohexyl groups are especially interesting as substituents of $R_2$.

The substituent $R_4$ is preferably a hydrogen atom, a methyl, ethyl, propyl, 2-hydroxyethyl-, 2- or 3-hydroxypropyl, 3-methoxypropyl- or 2-ethoxyethyl group.

The coupling reaction is carried out preferably in a weakly acid to strongly acid medium at temperatures from 5° to 30° C.

The new acid monoazo dyestuffs possess very good neutral affinity for wool, silk, leather and synthetic polyamide fibers, and dye these fibers from neutral to weakly acid baths in orange to red shades which have very good fastness to light and wet agencies (water, washing, milling and perspiration). The dyeings can be discharged to white: the discharged areas do not darken on exposure to light.

In the examples set forth below the parts and percentages are by weight and the temperatures are in degree centigrade.

EXAMPLE 1

42.4 parts of 2-amino-4'-methyl-1.1'-diphenylsulfone-4-sulfonic acid-di-n-butylamide are diazotized in 150 parts of glacial acetic acid and 30 parts of concentrated hydrochloric acid by dropwise addition of a 50% aqueous solution of 7 parts of sodium nitrite at 20–25°. When the nitrite reaction has disappeared, 22.5 parts of 2-aminonaphthalene-5-sulfonic acid are added to the yellow diazo solution and the mass then stirred at 20–30° until the diazo compound is no longer indicated. The deep red solution is stirred into a solution of 40 parts of 30% sodium hydroxide in 1000 parts of a mixture of water and ice. The precipitated red dyestuff is filtered off, washed with a 2% common salt solution until neutral, and dried. It is a scarlet powder which dissolves in hot water to give red solutions and dyes wool, silk and synthetic polyamide fibers from neutral to weakly acid baths in scarlet shades of very good fastness to light and wet treatments. The dyeings are dischargeable to a good white, which does not darken on exposure to light.

The dyestuff reserves cellulose acetate and cellulose triacetate, polyacrylonitrile and polyester fibers fairly well, and viscose rayon well.

A typical dyeing procedure for this dyestuff is as follows:

The dyebath is set with 5000 parts of water, 10 parts of anhydrous sodium sulfate and 1 part of the dyestuff. 100 parts of a wool fabric are entered at 40° and the dyebath heated to 100° in the course of 15 minutes. It is maintained at this temperature for a further 30 minutes, upon which 20 parts of a 10% aqueous solution of acetic acid are added and dyeing continued at the same temperature for 30 minutes. During the dyeing process the evaporated water is continuously replaced. The wool, dyed in a scarlet shade, is removed from the bath, rinsed with water and dried.

EXAMPLE 2

33.1 parts of 1-aminobenzene-2-sulfonic acid-(4'-cyclohexyl)-phenylester are diazotized in 50 parts of glacial acetic acid and 25 parts of concentrated hydrochloric acid at 5–10° by dropwise addition of 35 parts of a 20% nitrite solution. On completion of diazotization the clear diazo solution is run into a suspension of 22.5 parts of 2-aminonaphthalene-5-sulfonic acid in 500 parts of water at 15–20° with stirring. The coupling reaction is brought to a close by dropping in a solution of 30 parts of crystallized sodium acetate in 120 parts of water. The precipitated dyestuff is filtered off, purified by redissolving and reprecipitation from dilute sodium carbonate solution, and dried.

It is a brick-red powder which is readily soluble in warm water. It dyes wool, silk and synthetic polyamide fibers from neutral to weakly acid baths in orange shades of good light and wet fastness.

EXAMPLE 3

33.3 parts of 1-amino-4-methylbenzene-2-sulfonic acid-(4'-tertiary amyl)-phenyl ester are diazotized as described in Example 2 and coupled with 22.5 parts of 2-aminonaphthalene-7-sulfonic acid in the same way. After further processing the dyestuff is obtained as a red powder. It readily dissolves in warm water and dyes wool, silk and synthetic polyamide fibers from neutral to weakly acid baths in red-orange shades of good fastness to light and wet treatments.

EXAMPLE 4

31.8 parts of 1-amino-5-chlorobenzene-2-sulfonic acid-(4'-chloro)-phenyl ester are diazotized as described in Example 2 and coupled in the same way with an aqueous suspension of 24 parts of 2-methylaminonaphthalene-6-sulfonic acid.

On further processing a red powder is obtained which dissolves with ease in hot water and dyes wool, silk and synthetic polyamide fibers from neutral to weakly acid baths in red shades of good fastness to light and wet treatments.

The following table contains further acid monoazo dyestuffs, which are characterized by the diazo and the coupling component and by the shade of the dyeing on wool.

Table

| Example No. | Diazo component (I) | Coupling component (II) | Shade of the dyeing on wool (III) |
|---|---|---|---|
| 5 | 2-aminobenzene-1-sulfonic acid-4'-bromophenylester. | 2-aminonaphthalene-5-sulfonic acid. | orange. |
| 6 | 2-amino-5-methylbenzene-1-sulfonic acid-4'-isooctyl-phenyl ester. | 2-ethylaminonaphthalene-6-sulfonic acid. | red-orange. |
| 7 | 2-aminobenzene-1-sulfonic acid phenyl ester. | 2-amononaphthalene-7-sulfonic acid. | Do. |
| 8 | 2-aminobenzene-1-sulfonic acid (4'-ethyl)-phenyl ester. | ---do--- | Do. |
| 9 | 2-aminobenzene-1-sulfonic acid (4'-isopropyl)-phenyl ester. | 2-(2'-ethoxy)-ethyl-aminonaphthalene-6-sulfonic acid. | Do. |
| 10 | 2-amino-5-methoxybenzene-1-sulfonic acid 4-tert.-butyl-phenyl ester. | 2-(3'-hydroxy)-propylamino-naphthalene-7-sulfonic acid. | Do. |

Formulae of representative dyestuffs of the foregoing examples are as follows:

EXAMPLE 2

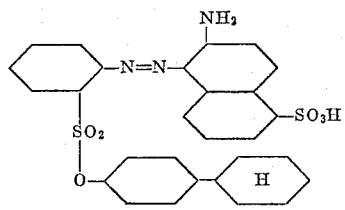

EXAMPLE 3

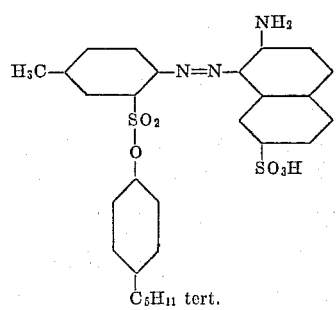

EXAMPLE 4

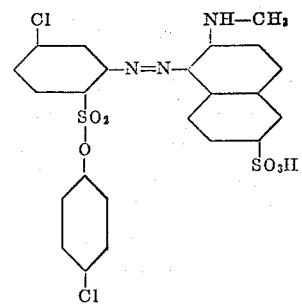

Having thus disclosed the invention what I claim is:

1. Acid monoazo dye of the formula

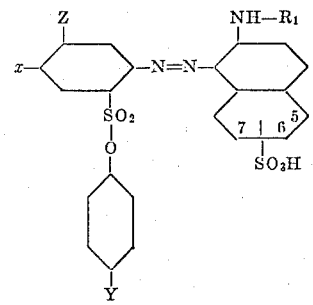

wherein
 x is a member selected from the group consisting of hydrogen, lower alkyl and lower alkoxy,
 y is a member selected from the group consisting of chlorine, bromine, lower alkyl and cycloalkyl,
 z is a member selected from the group consisting of chlorine and hydrogen,
 $R_1$ is a member selected from the group consisting of hydrogen, lower alkyl, hydroxyalkyl, and lower alkoxy-alkyl, and the —$SO_3H$ group is in one of the positions 5, 6 and 7.

2. The acid monoazo dyestuff of the formula

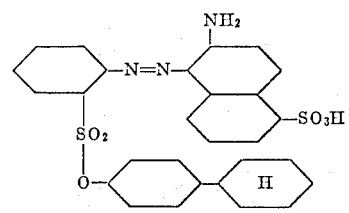

3. The acid monoazo dyestuff of the formula

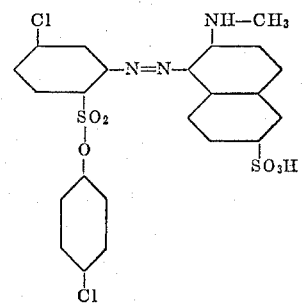

References Cited in the file of this patent
UNITED STATES PATENTS

| | | |
|---|---|---|
| 1,901,515 | Hentrich et al. | Mar. 14, 1933 |
| 2,075,076 | Zervas et al. | Mar. 30, 1937 |
| 2,837,508 | Frisch | June 3, 1958 |
| 2,849,437 | Montmollin et al. | Aug. 26, 1958 |